UNITED STATES PATENT OFFICE.

ALBRECHT SCHMIDT AND ROBERT VOSS, OF HÖCHST-ON-THE-MAIN, GERMANY, ASSIGNORS TO FARBWERKE, VORM. MEISTER LUCIUS & BRÜNING, OF HÖCHST-ON-THE-MAIN, GERMANY, A CORPORATION OF GERMANY.

BROMINATED BETA-NAPHTHYLINDIGO.

932,334.     Specification of Letters Patent.     Patented Aug. 24, 1909.

No Drawing.     Application filed March 24, 1908. Serial No. 422,916.

*To all whom it may concern:*

Be it known that we, ALBRECHT SCHMIDT, Ph. D., and ROBERT VOSS, chemist and engineer dipl., respectively, citizens of the Empire of Germany and of the Empire of Austria-Hungary, respectively, and residing at Höchst-on-the-Main, Germany, have invented certain new and useful Improvements in Making Bromo-Substitution Products of Beta-Naphthylindigo, of which the following is a specification.

According to the literature it is said that beta-naphthylindigo does not allow of direct bromination, but rather that a complete destruction of the molecule of the naphthylindigo takes place. We, however, have found that these references are not right in so far as bromo-substitution products of naphthylindigo may be obtained by a careful bromination. Even compared with beta-naphthylindigo, these products are distinguished by their superior fastness and clearness of shades.

This process may be carried out, for instance, as follows:

Example I: 15 parts by weight of beta-naphthylindigo are suspended in 500 parts by weight of carbon-tetra-chlorid, 13 parts by weight of bromin are added and all is stirred cold for 24 hours. After this it is filtered, washed subsequently with carbon-tetra-chlorid, and after drying, boiled with 10 parts by weight of a bisulfite solution and 100 parts by weight of water, refiltered, washed again, and reboiled with alcohol, until the filtrate runs off with a pure green color. The product is a dark green powder, containing approximately the amount of bromin calculated for mono-bromo-beta-naphthylindigo. It is soluble in concentrated sulfuric acid with a blue color, a little redder than beta-naphthylindigo, very difficultly soluble in most dissolving agents, more easily soluble in anilin, nitrobenzene and chloroform. In an alkaline hydrosulfite vat, cotton is dyed light green with much faster tints, than those obtained with beta-naphthylindigo.

Example II: 15 parts by weight of beta-naphthylindigo are suspended in 500 parts by weight of carbon-tetra-chlorid, 53 parts by weight of bromin are added and boiled in a reflux cooling apparatus for 36 hours. The working is carried out as in Example I. A blackish-green powder, is obtained containing on the average the approximate amount of bromin calculated for dibromo-beta-naphthylindigo. This dyestuff dissolves in concentrated sulfuric acid with a reddish blue tint, it is very difficultly soluble in the usual solvents, moderately soluble in nitrobenzene and anilin. In a vat it dyes cotton in light and fast green shades.

Example III: 15 parts by weight of naphthylindigo are entered in small portions, being cooled by ice, into about 100 parts by weight of liquid bromin, and the mass stirred for about 2 days while being well cooled. It is then diluted with carbon-tetra-chlorid, worked out as in Example I. The dyestuff forms a blackish green powder, containing the approximate quantity of bromin, calculated for tetra-bromo-beta-naphthylindigo, is hardly at all soluble in cold concentrated sulfuric acid; either by warming or in monohydrate a blue violet solution is obtained. The product is soluble only with difficulty in the usual dissolving agents, somewhat more easily soluble in nitrobenzene and anilin.

In the alkaline hydrosulfite vat cotton is dyed in clear and fast green tints.

Having now described our invention, what we claim is:

1. The process herein described of making bromo-substitution-products of beta-naphthylindigo, therein consisting that beta-naphthylindigo is treated with bromin, substantially as described.

2. As new products, the brominated beta-naphthylindigoes dyeing cotton in the vat very fast clear green shades, being insoluble in the usual dissolving agents, soluble in concentrated sulfuric acid, monohydrate, anilin or nitrobenzene.

3. As a new product, the dibrominated beta-naphthylindigo being a dark green powder soluble in concentrated sulfuric acid with a reddish blue color, very difficultly soluble in the usual dissolving agents, fairly easily dissolved in nitrobenzene and anilin, forming when treated with alkaline reducing agents like hydrosulfite a vat solution from which cotton is dyed very fast clear green shades.

In testimony, that we claim the foregoing as our invention, we have signed our names in presence of two subscribing witnesses.

ALBRECHT SCHMIDT.
ROBERT VOSS.

Witnesses:
 JEAN GRUND,
 CARL GRUND.